Patented Jan. 23, 1940

2,188,193

UNITED STATES PATENT OFFICE 2,188,193

FERMENTATION PROCESS OF TREATING SUGAR WORTS

Heinrich Scholler, Munich, Germany

No Drawing. Application March 1, 1938, Serial No. 193,260. In Germany March 23, 1936

9 Claims. (Cl. 195—11)

This invention relates to a process for the saccharification of cellulose and particularly to the subsequent processing of the sugar worts produced thereby, whereby a more advantageous utilization of the different products obtained in the saccharification of cellulose is secured.

Prior to this invention processes for the separate production of different products of the saccharification of wood either involved fractional saccharification processes with concentrated acids or at least with acids of such a strength as cannot be considered for the process of the instant invention, or fractional crystallizations or separation of the volatile substances from the non-volatile substances.

The instant process contemplates the saccharification of cellulose and the like with dilute acids by percolation under pressure. Hitherto all the sugar wort obtained by such a process was processed by fermentation. The part of the wort yielded first was worked up, together in admixture with the later yield of wort, by fermentation.

In contra-distinction to this, the instant invention contemplates collecting the wort yielded in the percolation process as a series of portions in accordance with the nature of the respective sugars therein, the sugars in the respective portions being in concentrated proportions as compared with the average composition, and then processing said portions separately to secure the desired product.

Investigations of the individual wort portions have shown that the first portions obtained in the saccharification process are rich in pentoses and sometimes also in mannose, galactose, higher sugars, acetic acid, tanning matter, furfurol and other substances, whereas the last portion or portions of the wort is or are rich in glucose and may also contain levulinic acid, formic acid and other more or less valuable substances.

The advantage offered by the process of the instant invention consists in making possible and facilitating the production of the different products. Thus, for example, the first portions may be used for the production of pentoses and furfurol or transformation products thereof, and the last portion or portions may be used for the production of glucose.

According to this invention, the saccharification of cellulose and the like is effected with dilute acids by percolation under pressure by the Scholler process. Separate portions of the sugar wort produced therein and depending on the type of sugar therein are collected and then appropriately treated to secure the desired products thereof.

In order to more fully explain the invention, the process will be described in connection with the production of, for example, pentoses, furfurol and transformation products thereof from the first portions and glucose from the later or last portions.

In accordance with the principles of the instant invention, cellulose and the like is treated with dilute acid by percolation under pressure by the Scholler process. (See U. S. Patents Nos. 1,890,-304; 1,990,097; 2,123,211.) The first portions secured in this process, as previously mentioned, are rich in pentoses. Thus, the first portions are treated to remove the hexoses and thereafter the solution is concentrated by evaporation and the pentoses obtained therefrom by crystallization. If desired or required, known clarifying and purifying operations, such as decoloration, distillation of volatile admixtures, precipitation of impurities by neutralization, or other steps may be employed at suitable stages in the process.

The hexoses present in the first portions of the wort may be removed therefrom by various procedures. They may be removed by means of alcoholic yeast fermentation. In this embodiment, after the alcohol has been produced, it, and preferably also the yeast, are removed in any convenient manner from the solution containing the pentoses, and the resulting solution concentrated, preferably by evaporation, and treated as previously described.

Alternatively, the hexoses in the sugar wort may be employed as nutrients for the production (cultivation) of yeast or other micro-organisms, whereby the hexoses are destroyed and removed in this manner.

After the yeast or other micro-organisms have been removed from the solution containing the pentoses in any convenient manner, as by centrifuging or settling, the solution is concentrated by evaporation and the concentrated solution treated as previously described.

So far as the pentoses are to be employed in the production of furfurol, the alcohol produced (or other products of fermentation) may also be distilled off, together with the furfurol produced by the decomposing of the fermented wort with acid.

Another embodiment of th invention contemplates producing transformation products of the pentoses. According to this embodiment, the first portions yielded during the saccharification process and containing the pentoses are treated by fermenting with micro-organisms, such as lactic acid bacilli, butyric acid fungi, molds, etc., which attack the pentoses.

The previously described procedures for treating the first portions may be combined. Thus, for example, the first portions of the sugar wort may be treated to remove the hexoses, for example, as described by alcoholic yeast fermentation or utilizing the hexoses in the solution as nutrients for the production of yeast. Before or after driving off the alcohol produced, and if required after the removal or killing of the yeast, the pentoses not attacked in the preceding fermentation are subjected to subsequent treatment by suitable micro-organisms (lactic acid bacilli, acetic acid bacteria, butyric acid fungi, molds, and others).

If desired, in the procedure immediately before described wherein the hexoses are utilized as a nutrient medium, the resulting micro-organisms may be removed by centrifuging or settling prior to the treatment of the pentoses.

The later portions, especially the last portions, after having been concentrated by evaporation and decolorized, are utilized with advantage for obtaining glucose. In this procedure the methods usually employed in the starch sugar industry may be used, especially as regards the purifying, clarifying and decolorizing of the wort and crystallization and recrystallization.

The mother liquor remaining after the crystallization of the glucose may be utilized for the purpose of obtaining products of fermentation or micro-organisms. In following this course, the mother liquor may be treated alone or together with the first fractions of the wort.

Since it is obvious that various changes and modifications may be made in the above description without departing from the nature or spirit thereof, this invention is not restricted thereto except as set forth in the appended claims.

I claim:

1. A process which comprises treating cellulose with dilute acid by percolation under pressure, separately collecting portions of the wort successively yielded by the said dilute acid treatment of said cellulose, the first portions collected being rich in pentoses and the last portions collected being rich in glucose, removing the undesired substances in the first portions, concentrating the resulting solution, crystallizing the pentoses therefrom, concentrating the last portions, and crystallizing the glucose therefrom.

2. A process which comprises treating cellulose with dilute acid by percolation under pressure, separately collecting portions of the wort successively yielded by the said dilute acid treatment of said cellulose, the first portions collected being rich in pentoses and containing some hexoses, removing the hexoses from the said first portions, concentrating the resulting solution, and crystallizing the pentoses therefrom.

3. A process which comprises treating cellulose with dilute acid by percolation under pressure, separately collecting portions of the wort successively yielded by the said dilute acid treatment of said cellulose, the first portions collected being rich in pentoses and containing some hexoses, fermenting the hexoses in said first portions by yeast, removing the resulting product of fermentation, concentrating the resulting solution, and crystallizing the pentoses therefrom.

4. A process which comprises treating cellulose with dilute acid by percolation under pressure, separately collecting portions of the wort successively yielded by the said dilute acid treatment of said cellulose, the first portions collected being rich in pentoses and containing some hexoses, utilizing said first portions as a nutrient medium in the production of yeast wherein the hexoses are consumed, removing the yeast, concentrating the resulting solution, and crystallizing the pentoses therefrom.

5. A process which comprises treating cellulose with dilute acid by percolation under pressure, separately collecting portions of the wort successively yielded by the said dilute acid treatment of said cellulose, the first portions collected being rich in pentoses, and fermenting the pentoses in said first portions by treatment with pentose-fermenting micro-organisms.

6. A process which comprises treating cellulose with dilute acid by percolation under pressure, separately collecting portions of the wort successively yielded by the said dilute acid treatment of said cellulose, the first portions collected being rich in pentoses and containing some hexoses, converting the hexoses in said first portions into alcohol by yeast fermentation, and fermenting the pentoses in said first portions with pentose-fermenting micro-organisms.

7. A process which comprises treating cellulose with dilute acid by percolation under pressure, separately collecting portions of the wort successively yielded by the said dilute acid treatment of said cellulose, the first portions collected being rich in pentoses and containing some hexoses, converting the hexoses in said first portions into alcohol by fermentation with yeast, removing said alcohol by distillation, concentrating the resulting solution, and crystallizing the pentoses therefrom.

8. A process which comprises treating cellulose with dilute acid by percolation under pressure, separately collecting portions of the wort successively yielded by the said dilute acid treatment of said cellulose, the first portions collected being rich in pentoses and containing some hexoses, utilizing said first portions as a nutrient medium in the production of yeast wherein the hexoses are consumed, removing the yeast and fermenting the pentoses in the resulting solution by treatment with micro-organisms which ferment pentoses.

9. A process which comprises treating cellulose with dilute acid by percolation under pressure, separately collecting portions of the wort successively yielded by the said dilute acid treatment of said cellulose, the last portions collected being rich in glucose, concentrating said last portions, and crystallizing the glucose therefrom.

HEINRICH SCHOLLER.